United States Patent Office 3,097,719
Patented July 16, 1963

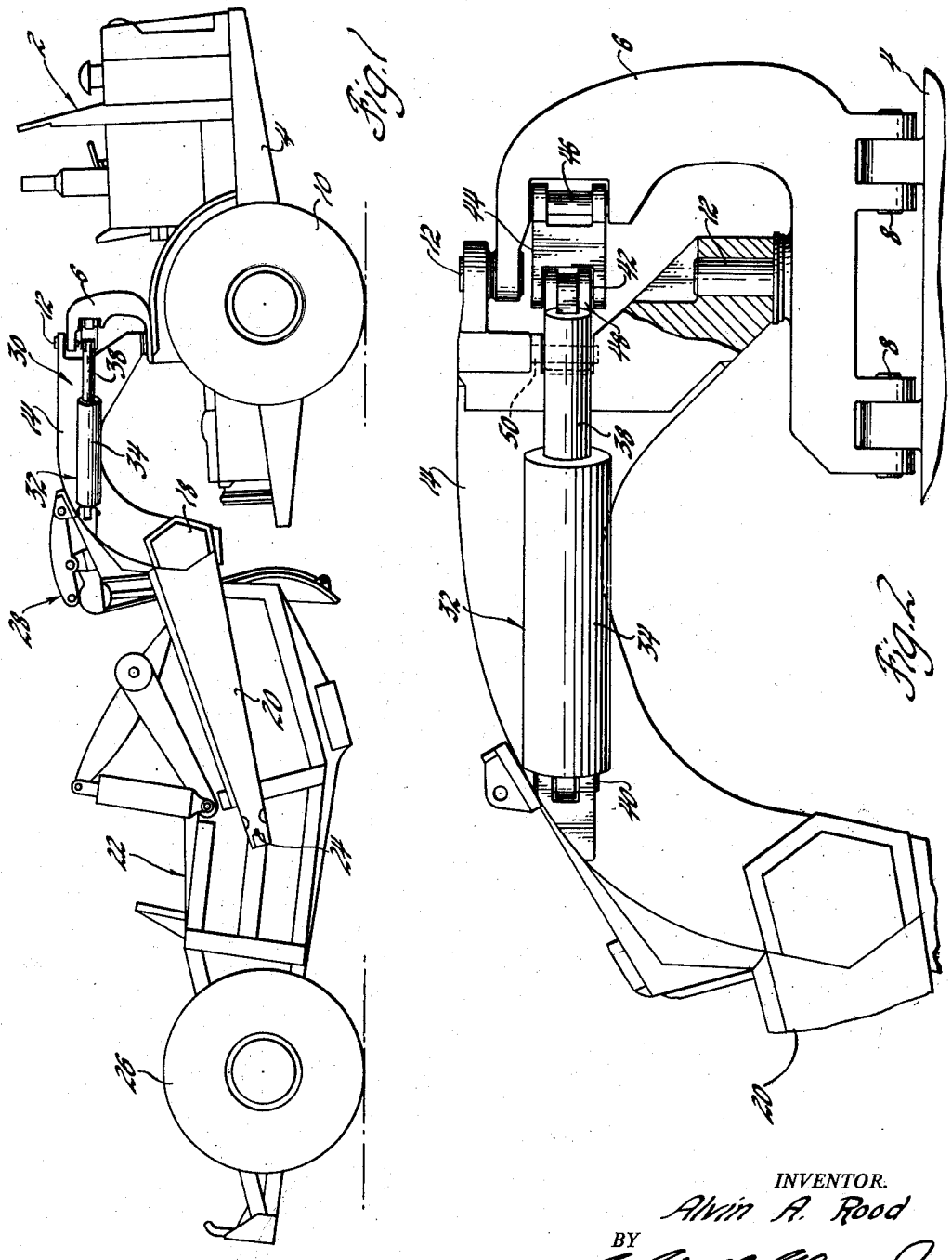

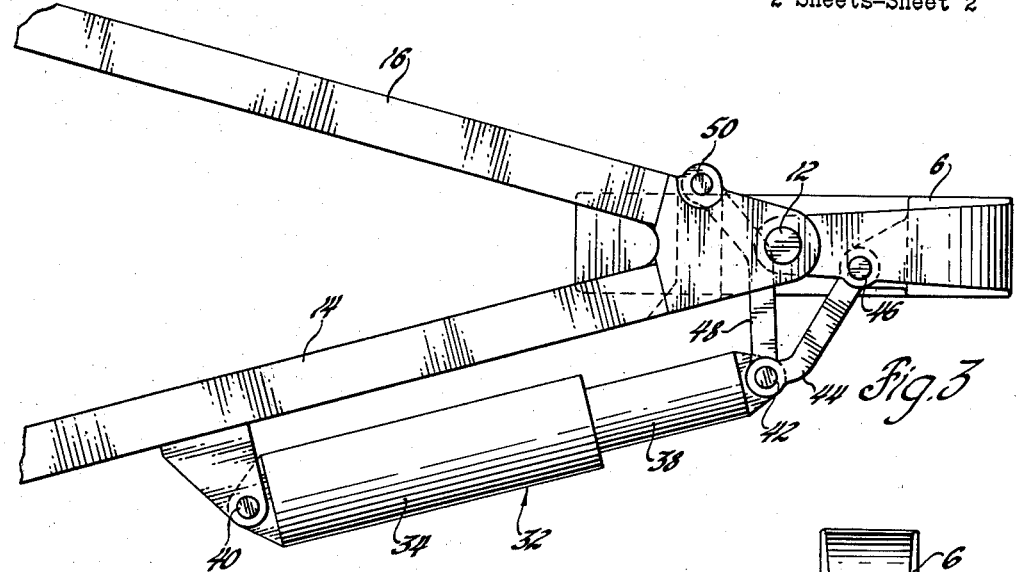
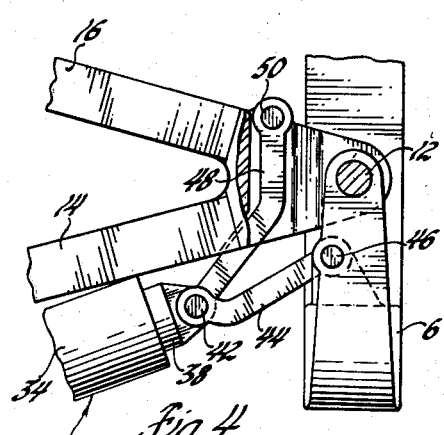
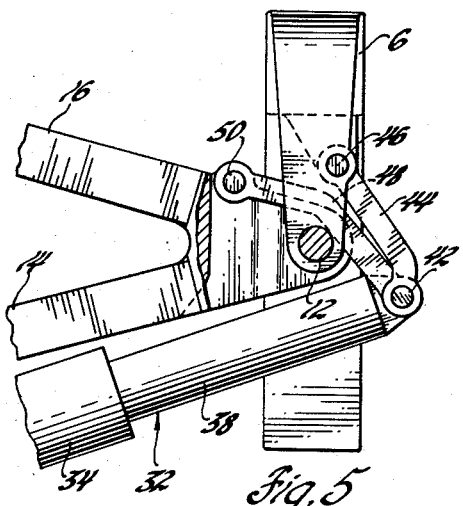
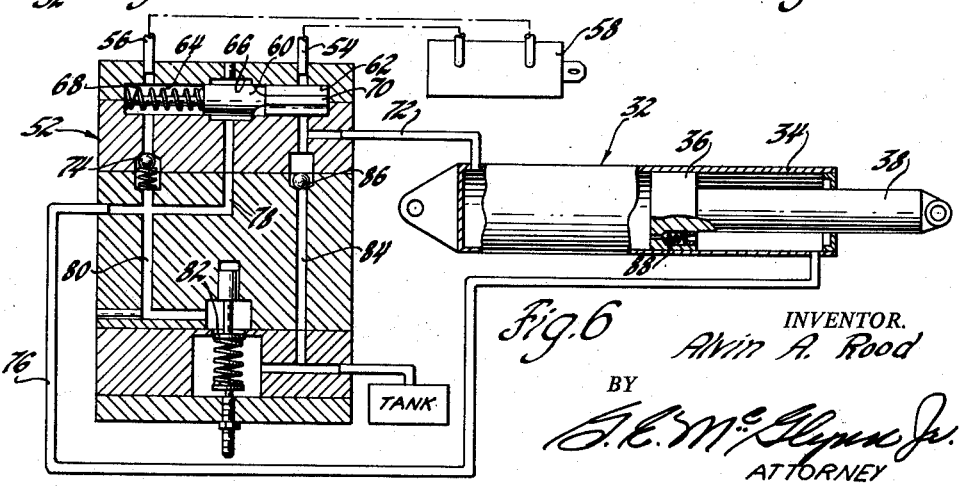

3,097,719
POWER STEERING FOR ARTICULATED VEHICLES
Alvin A. Rood, Willoughby, Ohio, assignor to General Motors Corporation, Detroit, Mich., a corporation of Delaware
Filed Oct. 6, 1960, Ser. No. 60,966
13 Claims. (Cl. 180—79.2)

This invention pertains to a power steering apparatus and system for vehicles comprising articulately interconnected frame sections and, more particularly, for self-propelled scraper vehicles of the type comprising a tractor-drawn scraper bowl in which the tractor and scraper are articulately interconnected about a vertical steering axis.

Vehicles of the type to which the present invention pertains typically comprise two frame sections each of which is provided with suitable non-dirigibly mounted ground-engaging wheels, and the frame sections being articulately interconnected by suitable means to define a vertical axis of relative steering articulation therebetween. While vehicles of this type may be employed in various environments, such as prime movers adapted to be equipped with several attachments such as a front end loader linkage or dozer blade, the present invention particularly comprehends a self-propelled scraper construction in which the two frame sections aforementioned consist of a two-wheeled overhung tractor articulately connected to a drawn two-wheeled scraper bowl. Consequently, further description of the invention will proceed with reference to the scraper art, it being understood that the invention is equally adaptable to other articulated vehicles as mentioned above.

In articulated vehicles of the type aforementioned, including scrapers, steering is accomplished by bodily articulating the two frame sections relative to each other about a vertical steering axis. One apparatus which has been utilized to bodily articulate the two frame sections of a scraper vehicle for steering purposes has comprised one or more pairs of fluid pressure operated steering jacks, each jack being operatively pivotally connected between the tractor and the scraper bowl. In such installations, the one pair of jacks or each pair of steering jacks are selectively operated to expand or contract to bodily articulate the frame sections, thus steering the vehicle. An example of such a fluid power steering system for a self-propelled scraper may be seen in United States Patent No. 2,841,231 granted to G. E. Armington on July 1, 1958.

It will be noted from a consideration of the Armington patent aforementioned that the scraper vehicle disclosed therein is capable of relative steering articulation between the two frame sections 90° to either side of straight-ahead alignment of the tractor and scraper bowl. Such a large range of steering movement, often termed 180° steer, is highly desirable in scraper vehicles in order to more efficiently and effectively maneuver the latter. To this end, various other fluid pressure systems of this general type have been suggested, but in each case has required at least one pair of fluid pressure operated steering jacks. Some systems have embodied four jacks; that is, two pairs of jacks.

In such scraper steering systems, each steering jack comprises a piston reciprocably disposed within a cylinder with the piston member of the jack operatively pivotally connected to one frame section and the cylinder member thereof operatively pivotally connected to the other. Due to the operative pivotal connections between any one jack and the two frame sections, and depending upon the angular steering relation of the two frame sections, it will become obvious that the mechanical advantage of the jack relative to the steering axis will vary. Moreover, it will be readily apparent that, since the rod side of the piston has less effective thrust-producing area than the head side thereof, the available thrust from such jack will be greater when it is being operated by pressure supplied to the piston head end thereof. As a consequence, in the prior art systems of this type, any given fluid pressure operated jack will deliver varying output torque because its mechanical advantage with respect to the steering axis and the thrust developed thereby will vary. For obvious reasons, it would be unsatisfactory if the output torque supplied by the steering system varied substantially during the steering operation. Consequently, the approach in the prior art has been to pair these jacks so that, while the output torque of one jack may progressively increase or decrease during steering in any given direction, the output torque from the other jack may progressively decrease or increase a corresponding amount so as to provide a substantially constant output torque throughout the entire range of steering movement.

It is, therefore, a principal object and feature of this invention to provide a fluid pressure operated steering system for an articulated vehicle, such as a self-propelled scraper, in which a single fluid pressure operated steering jack may be employed while providing a substantially or relatively constant output torque therefrom throughout the entire range of relative steering articulation of the vehicle frame sections.

It is yet another object and feature of this invention to provide a fluid pressure steering system and apparatus for articulated vehicles comprising a single steering jack and operating linkage connected thereto so constructed and arranged relative to the frame sections of the vehicle to provide a substantially or relatively constant mechanical advantage throughout the entire range of steering movement of the vehicle.

It is yet another object and feature of this invention to provide a single jack steering system as aforementioned in which the jack is of the double acting variety, but delivers equal thrust in both directions of operation thereof.

It is yet another object and feature of this invention to provide, in combination with a scraper vehicle including a tractor connected on a vertical hitch and steering axis to a drawn scraper bowl, a single fluid pressure operated steering jack operatively pivotally connected to the tractor and scraper on opposite sides of the vehicle steering axis in such a manner as to provide a substantially or relatively constant mechanical advantage for the jack and equal thrust generated from the jack while operating in either of two directions, thereby resulting in a substantially or relatively constant output torque from the jack throughout the entire 180° steering range of the vehicle.

In general, these and other objects of the invention are attained in a vehicle such as a scraper comprising a two-wheeled tractor articulately connected on a vertical hitch and steering axis to a two-wheeled drawn scraper bowl, the pivotal interconnection between the tractor and scraper bowl permitting 90° steer to either side of straight-ahead steering alignment of the vehicle frame sections; that is, the tractor and scraper bowl. A single fluid pressure operated steering jack including relatively reciprocable piston and cylinder members is operatively pivotally connected through a drive linkage between the tractor and scraper bowl on opposite sides of the vertical steering axis, whereby the mechanical advantage of the jack remains substantially or relatively constant during steering. The piston member of the jack includes a piston rod rigidly secured to a piston head, the area of the piston head in one end of the cylinder being twice the area of the piston rod disposed in the other end of the cylinder. A suitable fluid pressure system is provided comprising means for selectively supplying operating fluid under pressure to either the head or the rod side of the cylinder, respectively, and an automatically operable pressure responsive control valve which selectively communicates or disrupts communication between the head and rod sides of the cylinder. Thus, when operating pressure is delivered to the head side of the cylinder, the pressure responsive control valve automatically communicates the rod side of the cylinder to the head side thereof for circulation of fluid therebetween to give an effective operating area of the piston equal to the area of the piston rod. Conversely, in response to fluid under pressure being delivered to the rod side of the cylinder, the aforementioned control valve disrupts such communication and vents the head side of the cylinder to tank. Consequently, the single steering jack will develop the same thrust during expansion or contraction which, coupled with the substantially constant mechanical advantage provided by the connection of the jack to the vehicle frame sections, provides a substantially or relatively constant output torque through the entire range of steering movement of the scraper.

The structure by which the foregoing objects are attained will become more apparent hereinafter as the description of the invention proceeds, and in which reference is made to the drawings in which:

FIGURE 1 is a side elevation of a self-propelled four-wheeled scraper with the tractor and scraper bowl thereof in straight-ahead steering relation;

FIGURE 2 is an enlarged fragmentary view of FIGURE 1 illustrating certain details of the pivotal steering connection between the tractor and scraper, and the steering mechanism therefor;

FIGURE 3 is a top plan view of FIGURE 2;

FIGURE 4 is a view corresponding generally to FIGURE 3, but showing the position of the steering mechanism in a 90° steer to the right;

FIGURE 5 corresponds generally to FIGURE 4, but shows the steering mechanism in a 90° steer to the left; and FIGURE 6 is a schematic illustration of the fluid system controlling operation of the steering jack.

At this juncture, it should be noted that the drawings illustrate the invention in conjunction with only one type of scraper vehicle with which it may be used, there being other scraper arrangements to which the invention is readily adaptable. Inasmuch as such scraper vehicles are well known and are subject to variation in structural detail within the scope of the present invention, the description to follow is directed primarily to the inventive steering system and apparatus in order not to obscure the invention with unnecessary details. Suffice it to say that examples of scrapers of this type are disclosed in the aforementioned Armington patent, and United States Patent No. 2,773,320 granted to E. R. Fryer et al. on December 11, 1956.

Referring now to the drawings. the numeral 2 indicates a two-wheeled overhung tractor comprising a main frame 4 pivotally connected to an upstanding hitch member 6 on a longitudinal horizontal axis by means of the pivotal connections 8 illustrated in FIGURE 2. The ground-engaging drive wheels 10 are non-dirigibly mounted on their drive axles, and are driven by a suitable engine and transmission (not shown) supported on main frame 4. The hitch member 6 is connected by two vertically spaced pivotal connections 12 to the forward end of the usual pull yoke or draw bar comprising the rearwardly diverging gooseneck or frame members 14 and 16 which are rigidly secured at their rearward ends to the transversely extending torque tube 18. The usual pull arms 20 extend rearwardly from each end of the torque tube 18 so as to laterally embrace the side walls of the scraper bowl indicated generally at 22. The pull arms are pivotally connected in a suitable manner at 24 to the bowl side walls. The rearward portion of the scraper bowl is supported by the ground-engaging non-dirigibly mounted wheel means 26. Suitable operating means indicated generally at 28 are supported on the pull yoke and operatively connected to the frame of the scraper bowl and the apron thereof so as to control the operation of the scraper.

The fluid pressure operated steering mechanism for bodily articulating the tractor and scraper bowl about the vertical steering axis defined by the pivotal connections 12 is indicated generally at 30 in FIGURE 1, and comprises the double acting jack 32 including the cylinder 34 in which a piston is reciprocably disposed. The piston includes a piston head 36 rigidly secured to a piston rod 38 extending out of one end of the cylinder. It is significant to note at this juncture that the area of the piston head 36 is twice that of the piston rod 38 for a purpose to be described more fully hereinafter.

One end of the cylinder 34 is pivotally connected at 40 to a bracket rigidly secured to draw bar member 14, while one end of the piston rod 38 is pivotally connected at 42 to one end of a drive link 44, the other end of which is pivotally connected at 46 to the hitch member 6 forward of the axis of pivots 12. An idler link 48 has one end pivotally connected at 50 to the draw bar rearward of the axis of pivots 12, while the other end thereof is pivotally connected to the piston rod 38 and drive link 44 on the axis of pivotal interconnection 42 of these latter two members. It will be noted from a comparison of FIGURES 3 through 5 that the drive and idler links are suitably curved so as to prevent any interfering relationship with the adjacent structural members during steering of the vehicle 90° to either side of the straight-ahead steering alignment of FIGURE 3.

The geometry of the drive link 44 and idler link 48, and their respective pivotal connections to the hitch member 6, draw bar and piston rod 38 are such as to provide a substantially or relatively constant mechanical advantage for the jack 32 throughout the entire range of steering movement as indicated in FIGURES 4 and 5. Thus, the specific linkage disclosed in the drawing operates so that, for any given increment of extension or retraction of the jack 32, a given increment of steering articulation results. More specifically, for every inch of relative expansion or retraction of the jack 32, the pivotal connection 46 swings through an arc of approximately 6° resulting in 6° of turning movement of the tractor relative to the scraper bowl. Thus, a jack having approximately a thirty inch stroke provides 180° of steering movement and a substantially constant mechanical advantage throughout the entire range of steer. To this end, the dimensions and pivotal connections of the idler link 48 are such as to provide for the pivotal connection 42 thereof to swing in an arc having approximately a twenty-five inch radius about the pivotal connection 50. In similar fashion, the pivotal connection 46 of the drive link to the hitch member 6 swings in an arc having a radius of approximately ten inches about the vertical steering axis 12. Naturally, these dimensions and the relationship of the parts in general may be modified in view of design considerations such as length of jack 32 and the range of steer desired.

FIGURE 6 schematically illustrates the fluid pressure system utilized to control double acting steering jack 32, conventional and well known components of the system being illustrated diagrammatically or eliminated for the purpose of clarity and in order not to obscure the invention. Thus, the numeral 52 indicates a valve body adapted to be connected by the conduits 54 and 56 to a conventional manually operable selector valve 58 of the closed center type whereby one or the other of the conduits may be pressurized while the other is vented to tank. A pressure responsive shuttle valve 60 is reciprocably disposed within a housing or bore comprising the end chambers 62 and 64 and annular port 66 intermediate thereof. Chambers 62 and 64 respectively communicate with the conduits 54 and 56. A spring 68 surrounds a stop spindle projecting from one end of the valve 60, and is disposed within the chamber 64 so as to urge the valve to the positon shown in FIGURE 6 of the drawings, it being understood that another stop spindle 70 limits movement of the valve to the position shown. The conduit 54 communicates through the chamber 62 with the conduit 72 connected to the head side of the cylinder 34, while the conduit 56 communicates through the chamber 64 and a spring biased one way check valve 74 with the conduit 76 connected to the rod side of the cylinder. The conduit 76 is also connected through the conduit 78 to the port 66, and is connected through the conduit 80 and the conventional relief valve 82 to tank. The tank is also connected through conduit 84 and the one way check valve 86 to the delivery conduit 72 connected to the head side of the cylinder. Finally, it will be noted that a lightly spring loaded one way check valve and passage means 88 is provided in the piston head 36 so as to permit communication of fluid from the head side of the cylinder to the rod side thereof under conditions to be described, while preventing flow of fluid in the opposite direction.

In operation, it may be assumed that the vehicle is being steered straight-ahead as illustrated in FIGURES 1 through 3, the pivotal connection 8 of the tractor frame 4 to the hitch member 6 permitting relative frame oscillation between the tractor and bowl about a longitudinal horizontal axis, as is well known in the art. In order to steer the scraper vehicle to the left to any extent up to 90° as illustrated in FIGURE 5, the conventional manually operable control valve 58 is operated to pressurize conduit 54 and connect the conduit 56 to tank in the usual manner. This operating pressure is supplied through the conduit 72 to the head side of the cylinder 34 to expand the jack. At the same time, in response to the high operating pressure in the chamber 62, the shuttle valve 60 is moved to the left as shown in FIGURE 6 to compress the spring 68, thereby connecting the conduits 72 and 76 through conduit 78, port 66 and chamber 62. As the jack expands, fluid from the rod side of the cylinder circulates through the conduits 76 and 78, annular port 66 and chamber 62 to the conduit 72, and back to the head side of the cylinder. As a result, the head side of the cylinder having an area twice that of the rod side thereof and the piston areas projecting beyond the rod diameter being essentially pressure balanced, the fluid in the head side of the cylinder operates on an effective area equal to the area of the rod, and causes the jack to expand to dispose the frame sections as shown in FIGURE 5. When the selector valve 58 is closed thereby disrupting the supply of fluid to the conduit 54, the fluid trapped on each side of the piston head 36 will hold the jack in any selected steering position.

In making a 90° turn to the right as illustrated in FIGURE 4, the manually operable control valve 58 is operated to pressurize the conduit 56 and vent the conduit 54. Fluid under pressure is then supplied through the chamber 64 past the check valve 74 into the conduit 76 for flow to the rod side of the cylinder. The pressure of the operating fluid in the chamber 64, in conjunction with the spring 68, maintains the shuttle valve in the position shown in the drawing to prevent fluid communication between the conduit 78 and the chamber 62. The operating fluid acts upon the rod side of the cylinder, thereby contracting the jack 32, while fluid in the head side of the cylinder is vented through the conduit 72, chamber 62, conduit 54 and through valve 58 to tank. Under these circumstances, the scraper is articulated up to 90° as illustrated in FIGURE 4, while the operating fluid again acts on an effective area which is equal to the area of the piston rod 38. Consequently, the thrust developed by the jack 32 in either expanding or contracting is equal. Therefore, inasmuch as the mechanical advantage of the jack remains relatively or substantially constant during steering articulation of the scraper, and the thrust developed by the jack is equal whether pushing or pulling, the output torque developed by the single jack remains relatively constant throughout the entire 180° range of steering movement.

Should the selector valve 58 be in its neutral position disrupting flow through the conduits 54 and 56, as would be the case where the vehicle is being steered either straight-ahead or to any selected degree left or right thereof, and should a compressive shock be imposed on the steering jack 32, fluid is permitted to pass from the head side of the cylinder to the rod side thereof through the check valve 88, and may vent through the relief valve 82 to tank. Under the same circumstances, if a tensile shock is imposed on the jack 32, fluid on the rod side of the cylinder may again pass out through the relief valve 82 to tank, while the check valve 86 permits make-up fluid to be delivered from the tank to the conduit 72 and the head side of the cylinder.

From the foregoing description, it may be seen that the fluid pressure steering system of this invention provides a relatively or substantially constant output torque from a single fluid pressure operated jack throughout a 180° steering range of the scraper vehicle by maintaining the mechanical advantage of the steering jack relatively constant throughout this steering range, while providing equal thrust from the jack whether expanding or contracting. Accordingly, the single steering jack of this invention may be effectively employed in steering articulated vehicles, such as self-propelled scrapers, without requiring multiple jacks or multiple pairs of jacks.

While but one form of the invention has been shown and described, other forms will now be apparent to those skilled in the art. Therefore, the embodiment shown in the drawings is merely for illustrative purposes, and is not intended to limit the scope of the invention which is defined by the claims which follow.

I claim:

1. In combination, a vehicle comprising first and second frame sections, means pivotally interconnecting said frame sections on a steering axis for relative steering articulation therebetween to either side of straight-ahead steering alignment of said frame sections, a fluid pressure-operated steering jack including relatively reciprocable piston and cylinder members, means operatively connecting said jack between said frame sections to articulate the latter relative to each other a relatively constant amount throughout the entire steering range of said frame sections in response to each change of a given amount in the length of said jack to provide a relatively constant mechanical advantage for said jack in articulating said frame sections about said steering axis, said means including a pair of links, one of said links pivotally connected to the first frame member about a first pivot axis, the other of said links pivotally connected to the second frame member about a second pivot axis, means interconnecting said links about a third pivot axis, and means for selectively supplying operating fluid under pressure to the opposite ends of said cylinder, respectively, to steer said vehicle in opposite directions.

2. In combination, a vehicle comprising first and second frame sections, means pivotally interconnecting said frame sections on a steering axis for relative steering articulation therebetween to either side of straight-ahead steering alignment of said frame sections, a single fluid pressure-operated steering jack including relatively reciprocable piston and cylinder members, means operatively pivotally connecting said jack between said frame sections on opposite sides of said steering axis to articulate said frame sections relative to each other a relatively constant amount throughout the entire steering range thereof in response to each change of a given amount in the length of said jack to provide a relatively constant mechanical advantage for said jack in articulating said frame sections about said steering axis, said means including a pair of links, one of said links pivotally connected to the first frame member about a first pivot axis, the other of said links pivotally connected to the second frame member about a second pivot axis, means interconnecting said links about a third pivot axis, said first, second and third pivot axes being so located relative to each other that center lines interconnecting said pivot axes form a triangle enclosing said steering axis when said first and second frame members are in straight-ahead alignment, and means for selectively supplying operating fluid under pressure to the opposite ends of said cylinder, respectively, to steer said vehicle in opposite directions.

3. In combination, a vehicle comprising first and second frame sections, means pivotally interconnecting said frame sections on a steering axis for relative steering articulation therebetween to either side of straight-ahead steering alignment of said frame sections, a fluid pressure-operated steering jack including relatively reciprocable piston and cylinder members, means pivotally mounting one of said jack members on one of said frame sections, a drive link pivotally connected to the other of said jack members and to the other of said frame sections, an idler link pivotally connected to said one frame section and to said drive link and other jack member on the axis of pivotal interconnection of the latter, the respective pivotal connections between said jack members, links and frame sections providing a relatively constant mechanical advantage for said jack in articulating said frame sections about said steering axis, and means for selectively supplying operating fluid under pressure to the opposite ends of said cylinder, respectively, to steer said vehicle in opposite directions.

4. In combination, a vehicle comprising first and second frame sections, ground-engaging wheel means nondirigibly mounted on and supporting each of said frame sections, means pivotally interconnecting said frame sections on a vertical steering axis for relative steering articulation ninety degrees to either side of straight-ahead steering alignment of said frame sections, a single fluid pressure-operated steering jack including relatively reciprocable piston and cylinder members, means operatively pivotally connecting said jack between said frame sections on opposite sides of said steering axis to articulate said frame sections relative to each other a relatively constant amount throughout the entire steering range thereof in response to each change of a given amount in the length of said jack to provide a relatively constant mechanical advantage for said jack in articulating said frame sections about said steering axis, said means including a pair of links, one of said links pivotally connected to the first frame member about a first pivot axis, the other of said links pivotally connected to the second frame member about a second pivot axis, means interconnecting said links about a third pivot axis, said first and second pivot axis being so located relative to said third pivot axis that a first center line passing through two of the pivot axes moves through said steering axis when one of said frames is articulated relative to the other to one side of straight-ahead alignment and a second center line passing through two of said pivot axes moves through said steering axis when said one of said frames is articulated to the other side of straight-ahead alignment and means for selectively supplying operating fluid under pressure to the opposite ends of said cylinder, respectively, to steer said vehicle in opposite directions.

5. In combination, a vehicle comprising first and second frame sections, means pivotally interconnecting said frame sections on a steering axis for relative steering articulation therebetween to either side of straight-ahead steering alignment of said frame sections, a thrust-producing steering mechanism operatively pivotally connected between said frame sections and comprising a fluid pressure-operated steering jack including relatively reciprocable piston and cylinder members, said piston member including a piston head secured to a piston rod, the area of said piston head being twice that of said piston rod, and means for selectively supplying operating fluid under pressure to the head and rod sides of said cylinder, respectively, said last-named means including means responsive to operating pressure delivered to the head side of said cylinder for connecting the operating pressure with the rod side of the cylinder so as to maintain substantially equal pressure on each side of the piston as the jack is operated in one direction, and being responsive to operating pressure delivered to the rod side of said cylinder to vent the head side thereof to operate said jack in the opposite direction so as to permit said jack to develop substantially the same thrust during expansion and contraction.

6. In combination, a vehicle comprising first and second frame sections, means pivotally interconnecting said frame sections on a steering axis for relative steering articulation therebetween to either side of straight-ahead steering alignment of said frame sections, a thrust-producing steering mechanism operatively pivotally connected between said frame sections on opposite sides of said steering axis, and a single fluid pressure-operated steering jack including relatively reciprocable piston and cylinder members, said piston member including a piston head secured to a piston rod, the area of said piston head being twice that of said piston rod, and means for selectively supplying operating fluid under pressure to the head and rod sides of said cylinder, respectively, said last-named means including means responsive to operating pressure delivered to the head side of said cylinder for connecting said operating pressure with the rod side of the cylinder so as to maintain substantially equal pressure on both sides of the piston as the jack is operated in one direction, and being responsive to operating pressure delivered to the rod side of said cylinder to vent the head side thereof to operate said jack in the opposite direction so as to permit said jack to develop substantially equal thrust during expansion and contraction.

7. In combination, a vehicle comprising first and second frame sections, means pivotally interconnecting said frame sections on a steering axis for relative steering articulation therebetween to either side of straight-ahead steering alignment of said frame sections, a thrust-producing steering mechanism operatively pivotally connected between said frame sections and comprising a fluid pressure-operated steering jack including relatively reciprocable piston and cylinder members, said piston member including a piston head secured to a piston rod, said piston head having twice the area of said piston rod, means including first and second conduits for selectively supplying operating fluid under pressure to the head and rod sides of said cylinder, respectively, and valve means controlling communication between said conduits, said valve means being responsive to operating fluid pressure delivered through said first conduit to directly connect said first and second conduits whereby fluid at a pressure substantially equal to operating pressure circulates from the rod side of said cylinder to the head side thereof to operate said jack in one direction, and being responsive to operating pressure delivered through said second conduit to prevent communication between said conduits and vent said first conduit to operate said jack in the opposite direction so as to permit said jack to develop substantially the same thrust during expansion and contraction.

8. In combination, a vehicle comprising first and second frame sections, ground-engaging wheel means nondirigibly mounted on and supporting each of said frame sections, means pivotally interconnecting said frame sections on a vertical steering axis for relative steering articulation ninety degrees to either side of straight-ahead steering alignment of said frame sections, a thrust-producing steering mechanism operatively pivotally connected between said frame sections on opposite sides of said steering axis, said steering mechanism comprising a single fluid pressure-operated steering jack including relatively reciprocable piston and cylinder members, said piston member including a piston head secured to a piston rod, said piston head having twice the area of said piston rod, means including first and second conduits for selectively supplying operating fluid under pressure to the head and rod sides of said cylinder, respectively, and pressure responsive valve means controlling communication between said conduits and being responsive to operating fluid pressure delivered through said first conduit to the head side of said cylinder to directly connect said first and second conduits whereby fluid at a pressure substantially equal to the operating pressure circulates from the rod side of said cylinder to the head side thereof to operate said jack in one direction, and being responsive to operating pressure delivered through said second conduit to the rod side of said cylinder to prevent communication between said conduits and vent said first conduit to operate said jack in the opposite direction so as to permit the jack to develop substantially the same thrust during expansion and contraction.

9. In combination, a vehicle comprising first and second frame sections, means pivotally interconnecting said frame sections on a steering axis for relative steering articulation therebetween to either side of straight-ahead steering alignment of said frame sections, a fluid pressure-operated steering jack including relatively reciprocable piston and cylinder members, said piston member including a piston head secured to a piston rod, the area of said piston head being twice that of said piston rod, means operatively connecting said jack between said frame sections to articulate the latter relative to each other a relatively constant amount throughout the entire steering range of said frame sections in response to each change of a given amount in the length of said jack to provide a relatively constant mechanical advantage for said jack in articulating said frame sections about said steering axis, said means including a pair of links, one of said links pivotally connected to the first frame member about a first pivot axis, the other of said links pivotally connected to the second frame member about a second pivot axis, said links being interconnected about a third pivot axis, and means for selectively supplying operating fluid under pressure to the head and rod sides of said cylinder, respectively, said last-named means including means responsive to operating pressure delivered to the head side of said cylinder for connecting said operating pressure with the rod side of the cylinder so as to maintain both sides of the piston at a pressure substantially equal to the operating pressure during operation of said jack in one direction, and being responsive to operating pressure delivered to the rod side of said cylinder to vent the head side thereof to operate said jack in the opposite direction so as to permit the jack to develop substantially equal thrust during expansion and contraction.

10. In combination, a vehicle comprising first and second frame sections, means pivotally interconnecting said frame sections on a steering axis for relative steering articulation therebetween to either side of straight-ahead steering alignment of said frame sections, a fluid pressure-operated steering jack including relatively reciprocable piston and cylinder members, said piston member including a piston head secured to a piston rod, said piston head having an area twice that of said piston rod, means pivotally mounting one of said jack members on one of said frame sections, a drive link pivotally connected to the other of said jack members and to the other of said frame sections, an idler link pivotally connected to said one frame section and to said drive link and other jack member on the axis of pivotal interconnection of the latter, the respective pivotal connections between said jack members, links and frame sections providing a relatively constant mechanical advantage for said jack in articulating said frame sections about said steering axis, and means for selectively supplying operating fluid under pressure to the head and rod sides of said cylinder, respectively, said last-named means including an automatically operable pressure responsive control valve, said valve being responsive to operating pressure delivered to the head side of said cylinder to communicate the latter with the rod side thereof for circulation of fluid therebetween to operate said jack in one direction, and being responsive to operating pressure delivered to the rod side of said cylinder to vent the head side thereof to operate said jack in the opposite direction.

11. In combination, a vehicle comprising first and second frame sections, means pivotally interconnecting said frame sections on a steering axis for relative steering articulation therebetween to either side of straight-ahead steering alignment of said frame sections, a fluid pressure-operated steering jack including relatively reciprocable piston and cylinder members, said piston member including a piston head secured to a piston rod, said piston head having twice the area of said piston rod, means operatively connecting said jack between said frame sections to articulate the latter relative to each other a relatively constant amount throughout the entire steering range of said frame sections in response to each change of a given amount in the length of said jack to provide a relatively constant mechanical advantage for said jack in articulating said frame sections about said steering axis, said means including a pair of links, one of said links pivotally connected to the first frame member about a first pivot axis, the other of said links pivotally connected to the second frame member about a second pivot axis, said links being interconnected about a third pivot axis, means including first and second conduits for selectively supplying operating fluid under pressure to the head and rod sides of said cylinder, respectively, and pressure responsive means controlling communication between said conduits and being responsive to operating fluid pressure delivered through said first conduit to connect said first and second conduits whereby fluid under pressure directly circulates from the rod side of said piston to the head side thereof to operate said jack in one direction, and being responsive to operating pressure delivered through said second conduit to prevent communication between said conduits and vent said first conduit to operate said jack in the opposite direction so as to permit the jack to develop substantially the same thrust during expansion and contraction.

12. In combination, a vehicle comprising first and second frame sections, ground-engaging wheel means nondirigibly mounted on and supporting each of said frame sections, means pivotally interconnecting said frame sections on a vertical steering axis for relative steering articulation ninety degrees to either side of straight-ahead steering alignment of said frame sections, a single fluid pressure-operated steering jack including relatively reciprocable piston and cylinder members, said piston member including a piston head secured to a piston rod, said piston head having twice the area of said piston rod, means operatively pivotally connecting said jack between said frame sections on opposite sides of said steering axis to articulate said frame sections relative to each other a relatively constant amount throughout the entire steering range thereof in response to each change of a given amount in the length of said jack to provide a relatively constant mechanical advantage for said jack in articulating said frame sections about said steering axis, said means including a pair of links, one of said links pivotally connected to the first frame member about a first pivot axis, the other of said links pivotally connected to the second frame member about a second pivot axis, said links being interconnected about a third pivot axis, means including first and second conduits for selectively supplying operating fluid under pressure to the head and rod sides of said cylinder, respectively, and pressure responsive valve means controlling communication between said conduits, said valve means being responsive to operating fluid pressure delivered through said first conduit to the head side of said cylinder to directly connect said first and second conduits whereby fluid under pressure circulates from the rod side of said cylinder to the head side thereof to operate said jack in one direction, and being responsive to operating pressure delivered through said second conduit to the rod side of said cylinder to prevent communication between said conduits and vent said first conduit to operate said jack in the opposite direction.

13. In combination, a vehicle comprising first and second frame sections, ground-engaging wheel means non-dirigibly mounted on and supporting each of said frame sections, means pivotally interconnecting said frame sections on a vertical steering axis for relative steering articulation ninety degrees to either side of straight-ahead steering alignment of said frame sections, a single fluid pressure-operated steering jack including relatively reciprocable piston and cylinder members, said piston member including a piston head secured to a piston rod, said piston head having an area twice that of said piston rod, means pivotally mounting one of said jack members on one of said frame sections to one side of said steering axis, a drive link having one end pivotally connected to the other of said jack members and the other end thereof pivotally connected to the other of said frame sections on the other side of said steering axis, an idler link having one end pivotally connected to said one frame section on said one side of said steering axis and the other end thereof pivotally connected to said drive link and other jack member on the axis of pivotal interconnection of the latter, the respective pivotal connections between said jack members, links and frame sections providing a relatively constant mechanical advantage for said jack in articulating said frame sections about said steering axis, means including first and second conduits for selectively supplying operating fluid under pressure to the head and rod sides of said cylinder, respectively, and automatically operable pressure responsive valve means controlling communication between said conduits, said valve means being responsive to the pressure of the operating fluid delivered through said first conduit to connect said conduits whereby fluid under pressure circulates from the rod side of said cylinder to the head side thereof to operate said jack in one direction, and being responsive to the pressure of the operating fluid delivered through said second conduit to prevent communication between said conduits and vent said first conduit to operate said jack in the opposite direction.

References Cited in the file of this patent
UNITED STATES PATENTS

| | | |
|---|---|---|
| 2,638,998 | Rockwell | May 19, 1953 |
| 2,781,860 | Herr et al. | Feb. 19, 1957 |
| 2,863,234 | Armington | Dec. 9, 1958 |
| 2,885,021 | Routledge | May 5, 1959 |
| 2,967,582 | McColl | Jan. 10, 1961 |